E. V. ANDERSON.
VALVE.
APPLICATION FILED DEC. 23, 1907.
901,222.
Patented Oct. 13, 1908.
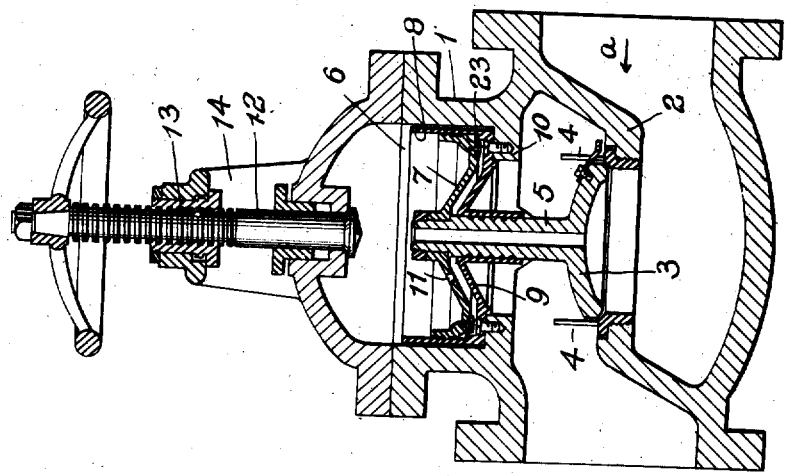
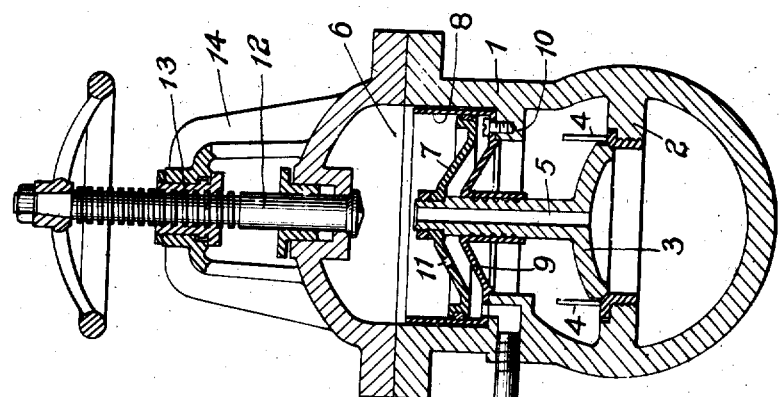
WITNESSES:
INVENTOR

UNITED STATES PATENT OFFICE.

EDWARD V. ANDERSON, OF MONESSEN, PENNSYLVANIA.

VALVE.

No. 901,222.  Specification of Letters Patent.  Patented Oct. 13, 1908.

Application filed December 23, 1907. Serial No. 407,828.

*To all whom it may concern:*

Be it known that I, EDWARD V. ANDERSON, residing at Monessen, in the county of Westmoreland and State of Pennsylvania, a citizen of the United States, have invented or discovered a certain new and useful Improvement in Valves, of which improvement the following is a specification.

The invention described herein relates to certain improvements in valve mechanism controlling the flow of fluid as steam and water from a source under pressure, and has for its object a construction wherein the valve may be shifted to and held in open position by the pressure of the fluid, and will also be automatically closed by the same fluid pressure in case of a breakage, as of a steam pipe, which would cause loss or injury.

The invention is hereinafter more fully described and claimed.

In the accompanying drawing forming a part of this specification Figure 1 is a view showing in sectional elevation a pilot and non-return valve embodying my improvement; Fig. 2 is a sectional elevation of the non-return valve mechanism on a plane at right angles to the plane of section of Fig. 1; Fig. 3 is a sectional detail view showing certain modifications of structure; and Fig. 4 is a sectional detail view showing a cushion to prevent a hammering of the valve and piston, when the former is closed by fluid pressure.

In the practice of my improvement the valve case or shell 1 is constructed to be inserted in a line of pipe in such manner that the fluid will flow therethrough in the direction indicated by the arrow $a$. The shell is divided transversely by a diaphragm 2 having a port or opening which is controlled by a valve 3. This valve which is preferably guided in its movements by pins 4 arranged around the port or opening through the diaphragm 2, is provided with a hollow stem 5 extending into a cylinder 6 formed on the shell 1 on the discharge side of the diaphragm. This stem is secured to a piston 7 in the cylinder provided with a loosely fitting lining 8 having the inner cylinder head 9 formed integral therewith, said parts being preferably formed of brass. This combined lining and cylinder head is detachably secured to a ledge 10 adjacent to the lower end of the cylinder.

Provision is made for a slow flow of fluid from the space above the piston to the space between the latter and the inner head 9, as by a leakage port 11, so that there may be an equalization of pressure on opposite sides of the piston, under certain conditions of use as hereinafter explained. When such equalization occurs or is approximated, the fluid pressure on the underside of the valve 3 will force the valve to and hold it in open position, until there is for any reason such a reduction of pressure below the piston that the pressure above the piston will overcome the upward pressure on the valve, thereby causing a closing of the valve.

Provision is made for the manual closing of the valve by means of a rod 12 having a threaded portion engaging a nut 13 held by a yoke 14 formed on or secured to the cap of the cylinder 6. This rod extends through a stuffing box in the cap and when the valve is to be closed manually is moved down against the piston forcing the valve to its seat. It will be observed that the ends of rod 12 and the stem 5 are so constructed that the passage through the stem is closed when the rod is screwed down to seat the valve 3.

The space between the piston and the head 9 is provided with an outlet port connected to a shell 15 of the pilot valve. The lower end of this case is closed by a suitable head and the upper end is normally closed by a valve 16 to prevent the escape of fluid through the outlet port 17. The valve 16 is held normally to its seat by fluid pressure on the flexible diaphragm 18 to the underside of which the valve 16 is secured. The space above the diaphragm is connected by a pipe 19 to the line of pipe controlled by the non-return valve, at a point outside of said valve. A spring 20 is arranged in the shell 15 and bears at its upper end against the valve 16, preferably through the medium of a plug 21. The tension of this spring is regulated by a screw 22. In case of a breakage of the line of pipe controlled by the non-return valve, the pressure on the diaphragm will be reduced and the valve 16 opened by the spring 20, thus permitting such escape of fluid from the space between the piston 7 and the head 9, that said piston will be shifted forcing the valve 3 to its seat and preventing any further flow of fluid along the broken pipe line.

As shown in Fig. 2, the corner of the piston may be cut away, and an annular plate 23 of resilient material secured to the piston in such manner as to extend over the recess 24 in the piston. An abutment 25 is formed at one end of the cylinder against which the plate 23 will strike before the piston reaches the end of the cylinder, and thereby form a resilient cushion or bearing for the piston.

In order to prevent a violent seating of the valve 3, the piston is formed with an annular projection 26 adapted to enter a correspondingly shaped groove in the lower head of the cylinder before the piston reaches the end of its stroke, as shown in Fig. 4. When this projection enters the groove a chamber is formed between the portions of the cylinder head and piston, within the projection, such chamber being closed except for slow leakage between the side walls of the projection and groove.

I claim herein as my invention:

1. In a valve mechanism, the combination of a casing having a passage therethrough, a valve controlling said passage, a cylinder, a piston arranged in said cylinder, a port or passage through the piston for conducting fluid under pressure to that side of the piston where it will operate to shift the valve to closed position.

2. In a valve mechanism, the combination of a casing having a passage therethrough, a valve controlling said passage, a cylinder, a piston arranged in said cylinder, a port or passage for conducting fluid under pressure to that side of the piston where it will operate to shift the valve to closed position, means for permitting the flow of fluid to the opposite side of the piston, and a normally closed escape from the cylinder on the side of the piston opposite that on which fluid pressure is introduced.

3. In a valve mechanism, the combination of a casing having a passage therethrough, a valve seating against pressure and controlling the flow of fluid through such passage, a cylinder, a piston connected to the valve, a port or passage for conducting fluid to the side of the piston where it will operate to close the valve, a port for the escape of fluid to the opposite side of the piston, an outlet on such side of the piston and a valve normally closed by fluid pressure controlling such outlet.

4. In a valve mechanism, the combination of a casing having a diaphragm with an opening therethrough, a cylinder having its axis in line with the center of the opening in the diaphragm a valve seating against pressure to close such opening and provided with a hollow stem for the passage of fluid into the cylinder, a piston connected to the stem, a port for the flow of fluid to the under side of the piston, an outlet port from the lower end of the cylinder, and a valve normally closed by fluid pressure controlling such outlet.

In testimony whereof, I have hereunto set my hand.

EDWARD V. ANDERSON.

Witnesses:
 FRANCIS J. TOMASSON,
 J. HERBERT BRADLEY.